US012801260B2

(12) United States Patent
Hsieh et al.

(10) Patent No.: US 12,801,260 B2
(45) Date of Patent: Nov. 17, 2026

(54) PROJECTION DEVICE, PROJECTION SYSTEM, AND METHOD OF CONTROLLING PROJECTION DEVICE

(71) Applicant: Coretronic Corporation, Hsin-Chu (TW)

(72) Inventors: Yu-Hsuan Hsieh, Hsin-Chu (TW); Kun-Hong Chen, Hsin-Chu (TW); Wen-Wei Tsai, Hsin-Chu (TW); Jung-Chi Chen, Hsin-Chu (TW); Chien-Yi Yang, Hsin-Chu (TW); Po-Yen Wu, Hsin-chu (TW); Yi-Jun Liao, Hsin-Chu (TW); Yun-Shih Chen, Hsin-Chu (TW); Ssu-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/188,021

(22) Filed: Apr. 24, 2025

(65) Prior Publication Data

US 2025/0355538 A1 Nov. 20, 2025

Related U.S. Application Data

(60) Provisional application No. 63/648,680, filed on May 17, 2024.

(30) Foreign Application Priority Data

Aug. 12, 2024 (CN) ......................... 202411100264.4

(51) Int. Cl.

| | |
|---|---|
| ***G06F 3/0482*** | (2013.01) |
| ***G06F 1/20*** | (2006.01) |

(Continued)

(52) U.S. Cl.

CPC ............ *G06F 3/0482* (2013.01); *G06F 1/206* (2013.01); *H04N 9/3144* (2013.01);

(Continued)

(58) Field of Classification Search

CPC ..... G06F 3/0482; G06F 1/206; H04N 9/3144; H04N 21/4122; H04N 21/41407; H04N 21/42203; H04N 21/4221; H04N 21/4222

See application file for complete search history.

(56) References Cited

U.S. PATENT DOCUMENTS

2009/0027629 A1* 1/2009 Yonezawa ............ H04N 5/7416 353/121

2011/0069234 A1* 3/2011 Kaise ..................... H04N 21/47 348/E5.077

(Continued)

FOREIGN PATENT DOCUMENTS

| | | |
|---|---|---|
| CN | 112269554 | 1/2021 |
| CN | 116165904 | 5/2023 |

(Continued)

OTHER PUBLICATIONS

Chun-Hsien Wu et al., “Projected Image Correction System, Projected Image Correction Method and Non-Transitory Computer-Readable Recording Medium,” unpublished U.S. Appl. No. 19/084,712, filed Mar. 19, 2025. The specification, claims, and the drawings of the unpublished pending U.S. application have been stored in the Documents & Transactions of Patent Center.

*Primary Examiner* — Hong Zhou
(74) *Attorney, Agent, or Firm* — JCIPRNET

(57) ABSTRACT

The present application relates to a projection device, a projection system, and a method of controlling a projection device. The projection system includes a controller and a projection device. The projection device includes a projection module and a processor. The projection module is configured to provide a projection image. The controller (Continued)

4a provides at least one control command to the projection device. The processor is coupled to the projection module, and the processor controls the projection device according to the at least one control command. In particular, the projection device is limited to not having an on-screen display (OSD) menu program, and therefore the projection image provided by the projection module controlled by the processor does not have an OSD menu.

20 Claims, 17 Drawing Sheets

(51) Int. Cl.

| | |
|---|---|
| ***H04N 9/31*** | (2006.01) |
| ***H04N 21/41*** | (2011.01) |
| ***H04N 21/414*** | (2011.01) |
| ***H04N 21/422*** | (2011.01) |

(52) U.S. Cl.
CPC ... *H04N 21/4122* (2013.01); *H04N 21/41407* (2013.01); *H04N 21/42203* (2013.01); *H04N 21/4221* (2013.01); *H04N 21/4222* (2013.01)

(56) References Cited

U.S. PATENT DOCUMENTS

| | | | | |
|---|---|---|---|---|
| 2017/0214897 | A1* | 7/2017 | Kado | G03B 21/206 |
| 2018/0332633 | A1* | 11/2018 | Komiyama | H04N 9/3179 |
| 2019/0116342 | A1* | 4/2019 | Sakai | H04N 5/66 |
| 2019/0278468 | A1* | 9/2019 | Tomono | G06F 1/1698 |
| 2021/0099680 | A1* | 4/2021 | Tokuyama | H04N 9/31 |

FOREIGN PATENT DOCUMENTS

| | | |
|---|---|---|
| CN | 118694903 | 9/2024 |
| TW | I341956 | 5/2011 |
| TW | 202242531 | 11/2022 |
| TW | 202412514 | 3/2024 |

* cited by examiner

4a

4b

PROJECTION DEVICE, PROJECTION SYSTEM, AND METHOD OF CONTROLLING PROJECTION DEVICE

CROSS-REFERENCE TO RELATED APPLICATION

This application claims the priority benefit of U.S. provisional applications Ser. No. 63/648,680, filed on May 17, 2024 and China application serial no. 202411100264.4, filed on Aug. 12, 2024. The entirety of the above-mentioned patent application is hereby incorporated by reference herein and made a part of this specification.

BACKGROUND OF THE INVENTION

Field of the Invention

The invention relates to a device, a system, and a method, and in particular, to a projection device, a projection system, and a method of controlling a projection device.

Description of Related Art

Generally, today's projection devices all may project an on-screen display (OSD) menu onto a screen to allow users to make relevant settings and adjustments to the projection device, such as adjusting the projection mode, switching signal sources, or adjusting the volume, and the like. However, in today's projection devices, the specifications of the OSD menu require different menu interfaces to be designed and presented according to the projector model, and the OSD menu has low commonality. Furthermore, since the functional specifications of projectors are not all the same, developers need to program for different functional specifications, thus consuming considerable manpower and man-hours.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE INVENTION

Other objectives, features and advantages of the present invention will be further understood from the further technological features disclosed by the embodiments of the present invention wherein there are shown and described preferred embodiments of this invention, simply by way of illustration of modes best suited to carry out the invention.

The invention provides a projection device, a projection system, and a method of controlling a projection device. A projection image displayed by the projection device may be limited to not having an on-screen display (OSD) menu. Other objects and advantages of the invention may be further understood from the technical features disclosed in the invention.

A projection device of the invention is configured to receive at least one control command. The projection device includes a projection module and a processor. The projection module is configured to project and display a projection image. The processor is coupled to the projection module, and the processor controls the projection device according to the at least one control command. In particular, the projection device is limited to not having an on-screen display (OSD) menu program, and therefore the projection image provided by the projection module controlled by the processor does not have an OSD menu.

A projection system of the invention includes a controller and the projection device, wherein the controller is communicatively connected to the projection device, and the controller provides the at least one control command to the projection device, so that the processor controls at least one function of the projection device according to the at least one control command.

A method of controlling a projection device of the invention is adapted for a projection system. The projection system includes a controller and a projection device. The projection device is adapted to project a projection image and includes a processor. The projection device is limited to not having an OSD menu program, and therefore the projection image projected by the projection device controlled by the processor does not have an OSD menu. The method includes the following steps. At least one control command is received from the controller via the projection device; and at least one function of the projection device is controlled according to the at least one control command via the processor.

Based on the above, the projection device, the projection system, and the method of controlling the projection device of the invention may be limited to not having the OSD menu in the projection image, thus allowing the use of processors without OSD menus, which is cheaper than processors having OSD menus. Also, since there is no need to design different menu interfaces for different projector models, the design process is simplified and costs are reduced at the same time.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of “including,” “comprising,” or “having” and variations thereof herein is meant to encompass the items listed thereafter and equivalents thereof as well as additional items. Unless limited otherwise, the terms “connected,” “coupled,” and “mounted,” and variations thereof herein are used broadly and encompass direct and indirect connections, couplings, and mountings.

The aforementioned and other technical contents, features, and effects of the invention will be clearly presented in the following detailed description of preferred embodiments with reference to the drawings. Directional terms mentioned in the following embodiments, such as up, down, left, right, front or back, etc., are only for reference to the directions in the attached drawings. Accordingly, the directional terms used are illustrative, not limiting, of the invention.

Figure 1A:
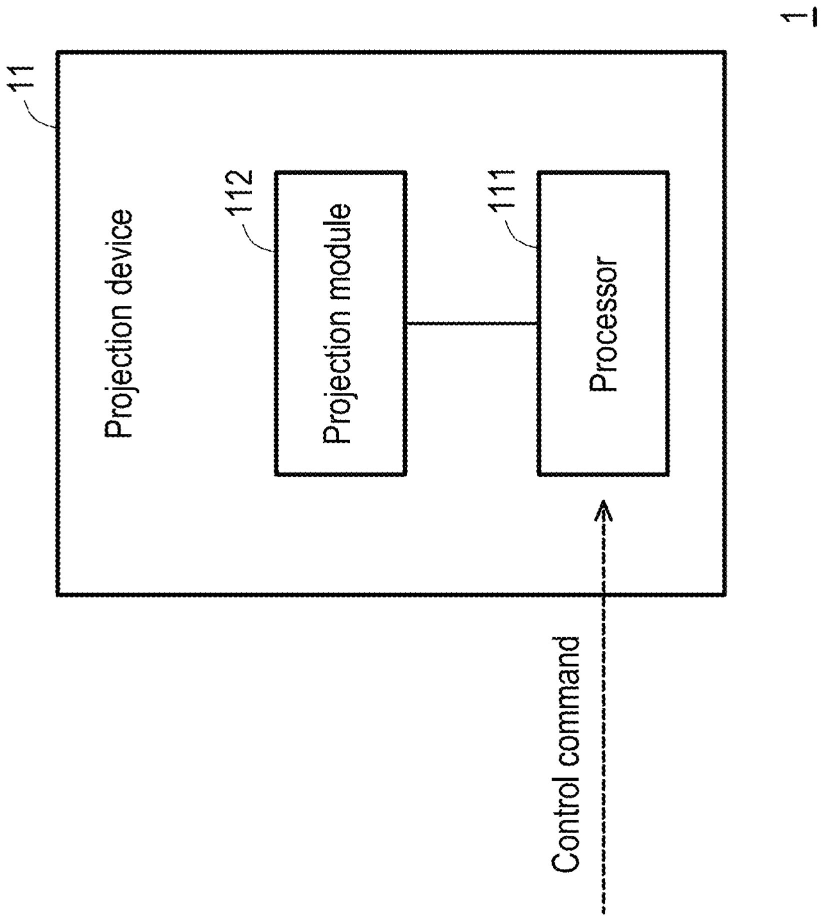
FIG. 1A is a block diagram of a projection device of an embodiment of the invention.

FIG. 1A is a block diagram of a projection device of an embodiment of the invention. As shown in FIG. 1A, a projection device 11 is configured to receive at least one control command. The projection device 11 includes a projection module 112 and a processor 111. The projection module 112 is configured to project and display a projection image. The processor 111 is coupled to the projection module 112, and the processor 111 may control the projection device 11 according to the at least one control command. In the embodiment, the projection device 11 is limited to not having an on-screen display (OSD) menu program. The projection image provided by the projection module 112 controlled by the processor 111 does not have an OSD menu.

Figure 1B:
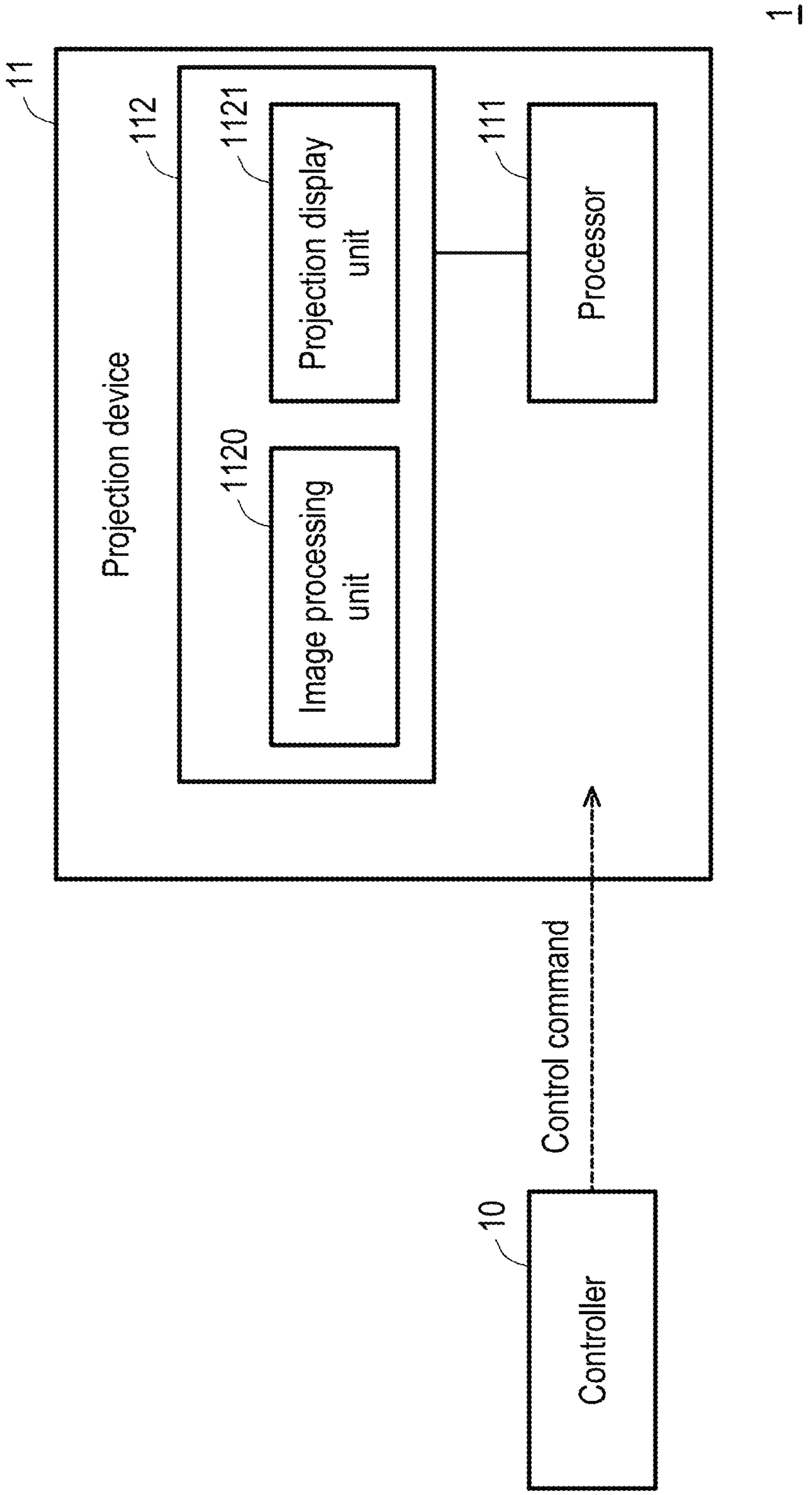
FIG. 1B is a block diagram of a projection system of an embodiment of the invention.

FIG. 1B is a block diagram of a projection system 1 of an embodiment of the invention. As shown in FIG. 1B, the projection system 1 includes a controller 10 and the projection device 11. The controller 10 is adapted to be communicatively connected to the projection device 11. The controller 10 provides at least one control command to the projection device 11 so that the processor 111 controls at least one function of the projection device 11 according to the at least one control command. Via the configuration of the controller 10 and the projection device 11, the projection system 1 limits the image projected by the projection device 11 to not display an OSD menu. Via the signal transmission between the controller 10 and the projection device 11, the design method of the projection system 1 is simplified and the cost of the projection system 1 is reduced.

In detail, the controller 10 may be coupled to the projection device 11 via wired or wireless means, and provides the at least one control command to the projection device 11 according to the control of the user, wherein the control command includes, for example, a control command of a projection operation.

The processor 111 is coupled to the projection module 112. The processor 111 may be, for example, a central processing unit (CPU), or other programmable general-purpose or special-purpose micro control unit (MCU), microprocessor, digital signal processor (DSP), programmable controller, application-specific integrated circuit (ASIC), graphics processing unit (GPU), arithmetic logic unit (ALU), complex programmable logic device (CPLD), field-programmable gate array (FPGA), any other type of integrated circuit, state machine, processor based on Advanced RISC Machine (ARM), or other similar elements, or a combination of the above elements.

The projection module 112 is configured to project and display a projection image. The projection module 112 includes a light source module (not shown), a projection display unit 1121, and an image processing unit 1120. It may be understood that, the light source module includes at least one light-emitting element configured to provide a light beam and an optical element configured to transmit the light beam or/and change the light beam path. The projection display unit 1121 includes a light valve and a projection lens. In addition, it should be noted that the projection device also includes an input receiving module (not shown), and the input receiving module is coupled to the processor 111 and the projection module 112 and configured to receive image data from an external image source, decode the input image data into display data having a preset specification, and provide the display data to the image processing unit 1120 of the projection module 112. After the image processing unit 1120 performs image processing on the display data, the processed display data is then provided to the projection display unit 1121 so that the projection lens projects a projection image. It should be further supplemented that the at least one light-emitting element in the light source module includes, for example, at least one light-emitting diode (LED), at least one laser diode (LD), or a combination of the above. The optical element transmitting the light beam or/and changing the light beam path includes, for example, an element such as a lens, a mirror, a reflector, a dichroic element; the light valve in the projection display unit 1121 is, for example, a reflective light modulator such as a liquid crystal on silicon (LCoS) panel or a digital micro-mirror device (DMD), or, in some embodiments, may also be a transmissive light modulator such as a transparent liquid-crystal panel, an electro-optical modulator, a magneto-optic modulator, an acousto-optic modulator (AOM); and the projection lens in the projection display unit is, for example, a combination of one or a plurality of optical lenses having diopter, for example, various combinations of non-planar lenses including biconcave lenses, biconvex lenses, concave-convex lenses, convex-concave lenses, plano-convex lenses, and plano-concave lenses. In the embodiment, the light valve in the projection display unit 1121 receives the light beam from the light source module and converts the light beam into an image beam, and provides the image beam to the projection lens in the projection display unit 1121, and the image beam is projected by the projection lens.

In the embodiment, the projection device 11 is limited to not having an OSD menu program, and therefore there is also no OSD menu in the projection image projected or provided by the projection module 112 controlled by the processor 111, and the controller 10 is adapted to provide at least one control command configured for controlling at least one function of the projection device 11 to the projection device 11.

In order to operate when the projection device 11 is limited to not display the OSD menu, the controller 10 of the projection system 1 has at least one button, and the at least one button is adapted to be pressed and correspondingly provide the at least one control command for controlling the at least one function of the projection device 11. M ore specifically, to operate without an OSD menu, the buttons disposed on the controller 10 may set corresponding control commands to allow the user to directly issue a control command by operating the corresponding button, thereby simplifying the control process of the overall projection system 1.

In some embodiments, the controller 10 of the projection system 1 may be, for example, a remote control having physical buttons. In another embodiment, the controller 10 may be, for example, a portable electronic device, such as a smart phone, a tablet, a laptop, etc. However, this is not a limitation, and any device on which an application program may be installed is applicable to the application. An application program is installed on a portable electronic device used as the controller 10. When the application program is launched, a function menu may be displayed at the screen of the portable electronic device. The function menu may have at least one function option, and the at least one function option is adapted to provide the at least one control command to control the at least one function of the projection device 11. That is, the user may control the projection device 11 to perform a corresponding operation and function by operating and selecting a function option on the function menu. Moreover, the application program of the portable electronic device (the controller 10) is, for example, provided by the manufacturer of the projection device 11, and may be downloaded to the portable electronic device (the controller 10) by the user to facilitate control of the projection device 11.

Figure 2B:
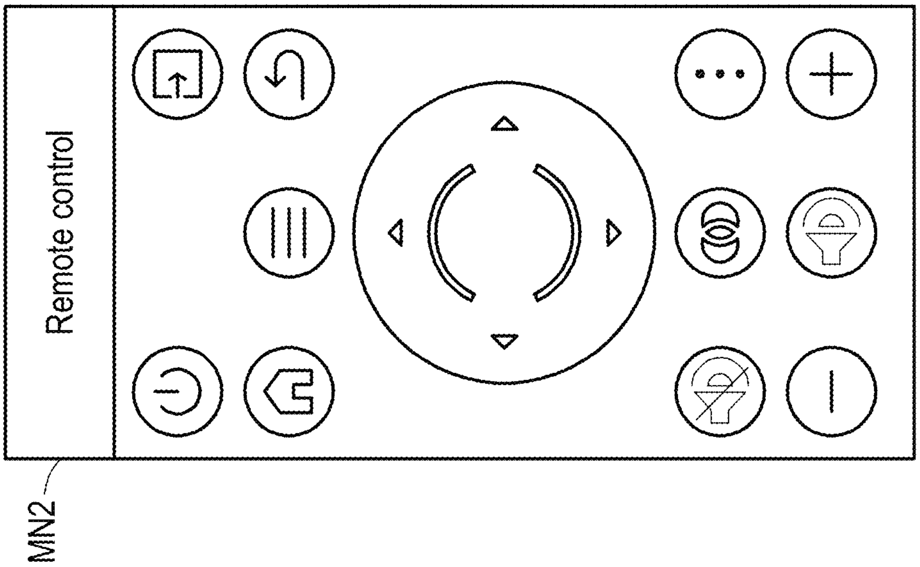
FIG. 2B is a schematic diagram of function buttons MN2 of a controller of an embodiment of the invention.
Figure 2A:
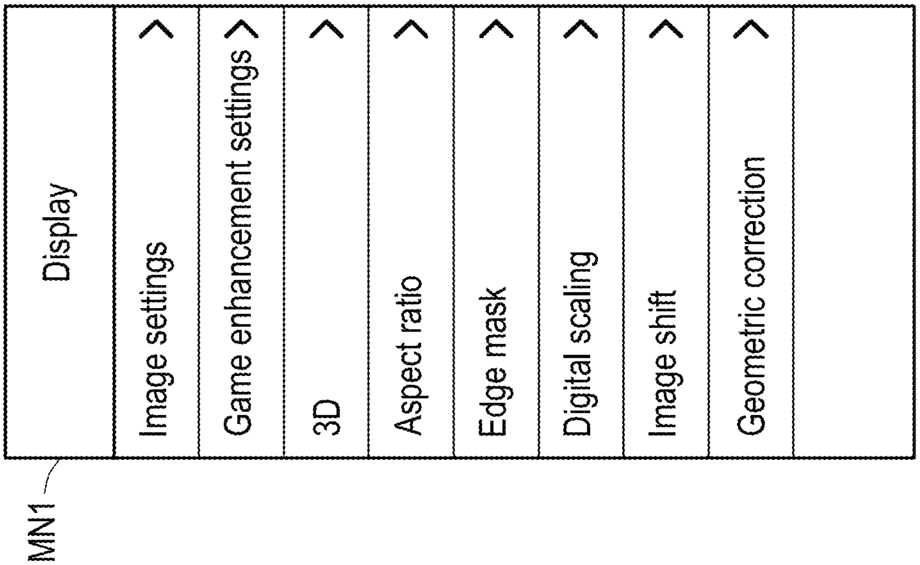
FIG. 2A is a schematic diagram of a function menu MN1 displayed on a controller of an embodiment of the invention.

FIG. 2A is a schematic diagram of a function menu MN1 displayed on the controller 10 of an embodiment of the invention. As shown in FIG. 2A, various sub-menus may be displayed on the function menu MN1. In the embodiment, the function menu MN1 has sub-menus such as image settings, game enhancement settings, 3D, aspect ratio, edge mask, digital scaling, image shift, geometric correction, etc., and the invention is not limited thereto. After clicking each sub-menu, the corresponding sub-menu may be entered to operate the corresponding function option to control the projection device 11 to perform the corresponding operation and function. Although not explicitly shown, in some embodiments, in addition to the function options, each sub-menu may also have a sub-menu at the next level for the user to select and control.

FIG. 2B is a schematic diagram of function buttons MN2 of the controller 10 of an embodiment of the invention. In the embodiment, the controller 10 is a remote control, and the function buttons MN2 on the controller 10 may be selected by the user for corresponding operation control. It should be mentioned that the operation interface formed by the function buttons MN2 of the embodiment may also be, for example, a default operation interface used as an application program in a portable electronic device that the user may open by clicking the corresponding function option in the application program.

Specifically, in order to control the projection device 11 not displaying the OSD menu, most of the buttons in the function buttons MN2 are set to corresponding control commands. In this way, the user may issue a control command to control the projection device 11 via the operation interface of the function buttons MN2 without an OSD menu. However, in some embodiments, specific control commands additionally require direction information or displacement information, including control commands such as manual keystone correction and manual screen shifting. When the user operates these control commands, the user may start the operation by clicking the corresponding button, and then make adjustments by clicking the direction button. Overall, the function buttons MN2 provide a relatively simple way to set buttons and control commands, so that the user may make adjustments by operating the buttons on the function buttons MN2 without an OSD menu, and issue a corresponding control command.

Figure 3A:
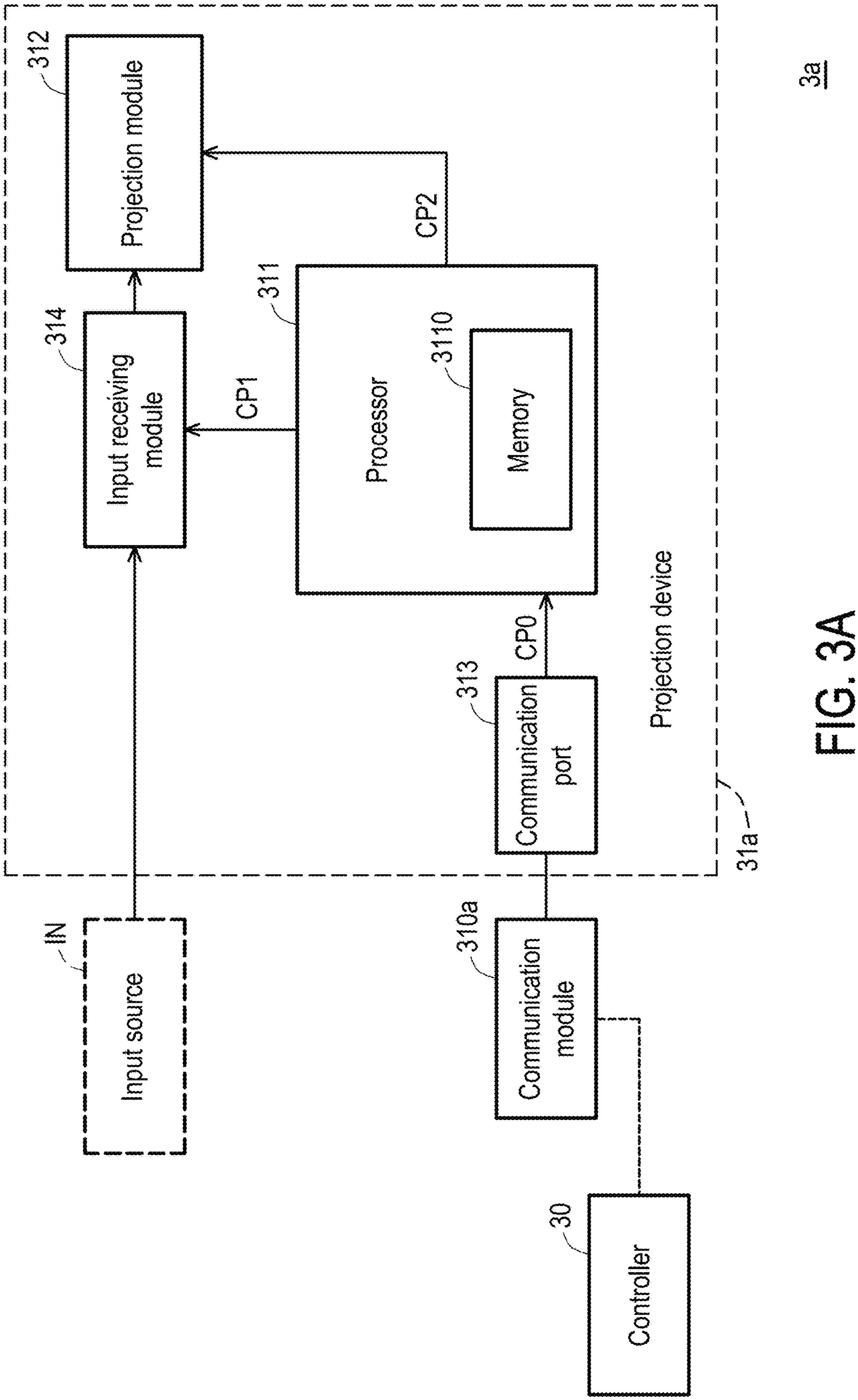
FIG. 3A is a block diagram of a projection system of an embodiment of the invention.

FIG. 3A is a block diagram of a projection system 3*a* of an embodiment of the invention. The projection system 3*a* in FIG. 3A is similar to the projection system 1 in FIG. 1B, and the difference is that in the embodiment, a projection device 31*a* shown in the projection system 3*a* includes a more detailed circuit block diagram and illustrates the arrangement of a communication module 310*a*.

Specifically, the controller 30 and the communication module 310*a* may be connected via a wireless communication interface, and the communication module 310*a* is further connected to the projection device 31*a*, thereby providing a control command to the projection device 31*a*. It should be noted that in the embodiment, the communication module 310*a* is externally connected to the projection device 31*a*, and the communication module 310*a* is coupled to the processor 311 of the projection device 31*a* and configured to receive at least one control command and transmit the at least one control command to the processor 311. For example, the communication module 310*a* may be an external accessory (such as a dongle) adapted to the controller 30.

It should be mentioned that the communication module 310*a* is, for example, a wired or wireless communication interface configured to communicate with the controller 30. For example, the wireless communication interface may include a Wireless Fidelity (WiFi) communication interface, a Bluetooth communication interface, a ZigBee communication interface, and/or other wireless communication interfaces. The wired communication interface may include a local area network (LAN) interface, a Universal Serial Bus (USB), a Universal Asynchronous Receiver/Transmitter (UART) interface, and/or other wired communication interfaces.

Furthermore, the projection device 31*a* has a processor 311, a projection module 312, a communication port 313, and an input receiving module 314. The communication module 310*a* is connected to the communication port 313 of the projection device 31*a*, thereby providing a control command from the controller 30 to the projection device 31*a*. The input receiving module 314 receives analog or digital image data from an external input source IN. The input receiving module 314 may be configured to decode the received image data into display data having a preset specification and provide the display data having the preset specification to the projection module 312. Although only a single input source IN is shown in FIG. 3A, in some embodiments, the input receiving module 314 may be coupled to a plurality of input sources. The input sources are, for example, displays, audio equipment, laptops, etc. The input receiving module may be, for example, a transmission interface such as HDMI, DP, VGA, USB. The input receiving module 314 may select one of the input sources according to the control to receive the image data and perform corresponding image format transcoding, and provide the transcoded display data to the projection module 312, so that the projection module 312 may project according to the display data to generate a projection image. In addition, the processor 311 is provided with a memory 3110. The memory 3110 is limited to not having an OSD menu program.

In addition, after the processor 311 receives the control command via a path CP0 formed by the communication port 313, the processor 311 may control the input receiving module 314 and the projection module 312 accordingly to perform a corresponding functional operation. In addition, although not explicitly shown in FIG. 3A, in a case that the controller 30 is a portable electronic device, the controller 30 has a memory. The memory may store an application program for the controller 30 to access and execute, thereby displaying a function menu on the screen.

For example, when the processor 311 receives the control command of switching the input source via the path CP0, the processor 311 may control the input receiving module 314 via a path CP1 to select the corresponding input source to achieve the control command. In another example, when the processor 311 receives a control command such as adjusting the projection range or performing keystone correction via the path CP0, the processor 311 may control the projection module 312 to perform the corresponding functional operation via a path CP2.

Figure 3B:
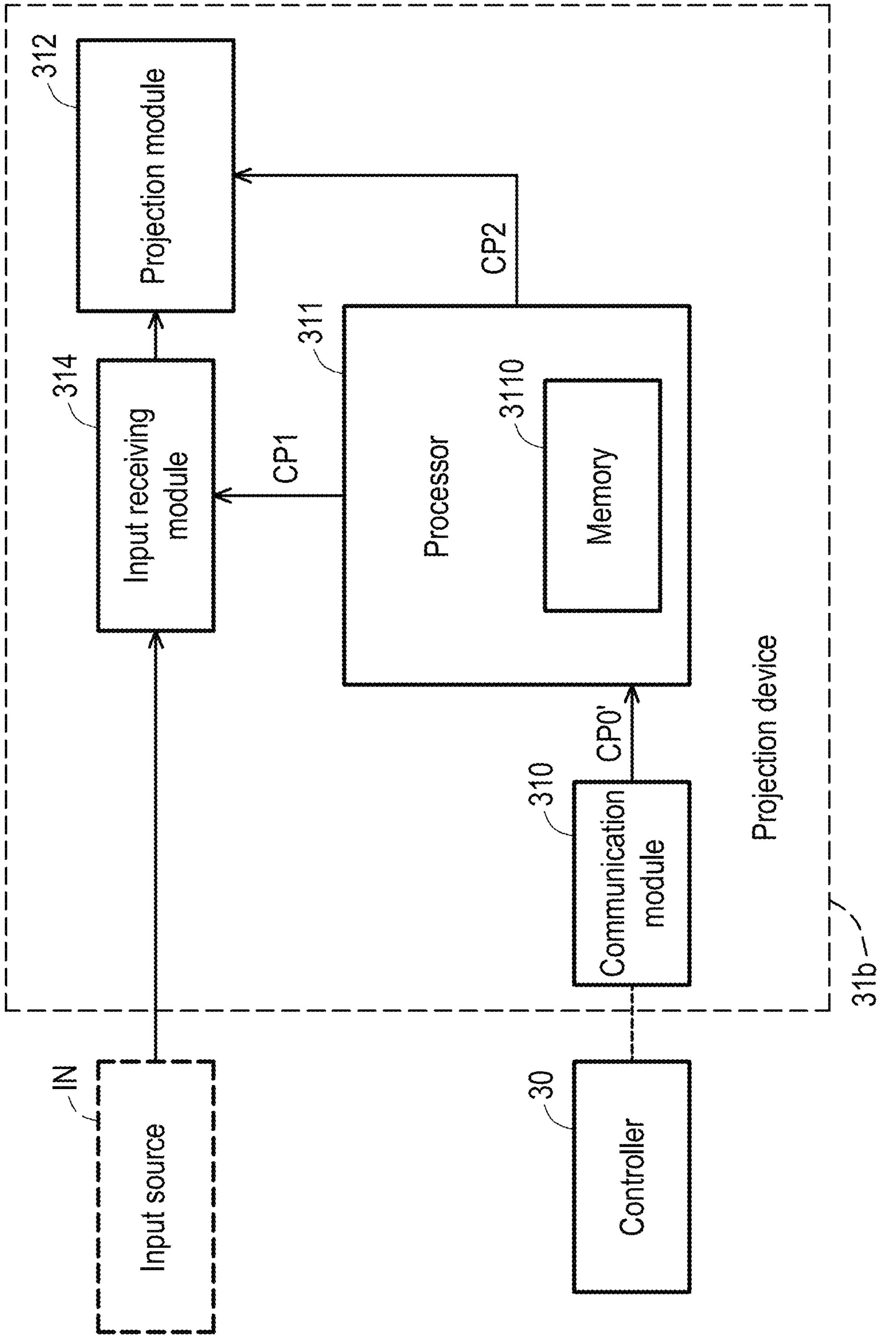
FIG. 3B is a block diagram of a projection system of an embodiment of the invention.

FIG. 3B is a block diagram of a projection system 3*b* of an embodiment of the invention. The projection system 3*b* in FIG. 3B is similar to the projection system 3*a* in FIG. 3A. The difference is that in the embodiment, the communication module 310 in the projection system 3*b* is built into the projection device 31*b*. The communication module 310 disposed in the projection device 31*b* does not require a communication port and may be directly connected to the processor 311 to transmit a control command. In the embodiment, the communication module 310 may be, for example, a wireless communication integrated circuit or a wireless signal connector built into the projection device 31*b*.

Figure 4A:
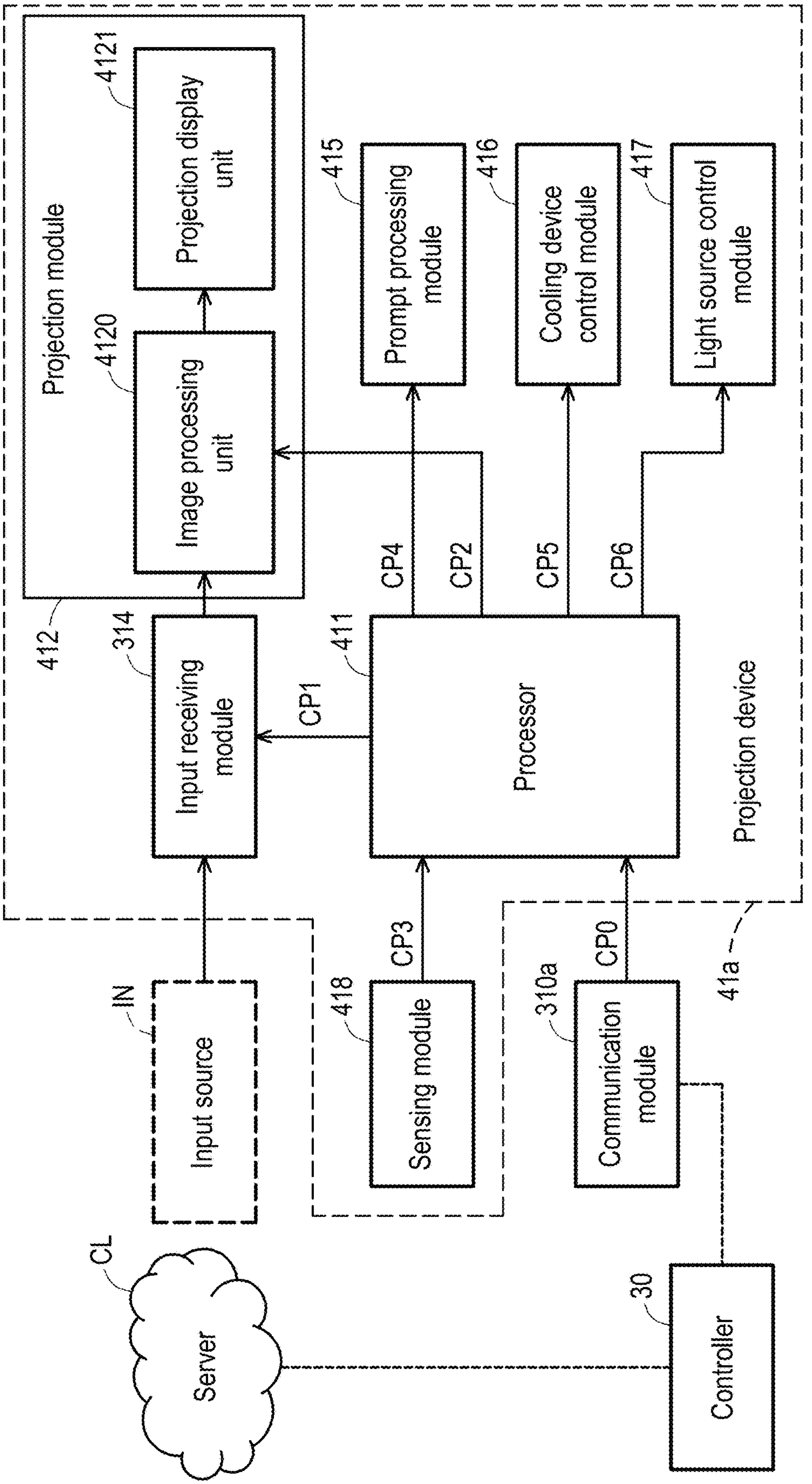
FIG. 4A is a block diagram of a projection system of an embodiment of the invention.

FIG. 4A is a block diagram of a projection system 4*a* of an embodiment of the invention. The projection system 4*a* in FIG. 4A is similar to the projection system 3*a* in FIG. 3A. The difference is that a projection device 41*a* of the projection system 4*a* further includes a prompt processing module 415, a cooling device control module 416, a light source control module 417, and a sensing module 418, and a more detailed structure is shown in the projection module 412, including an image processing unit 4120 and a projection display unit 4121. Lastly, in addition to being communicatively connected to the communication module 310*a*, the controller 30 is also communicatively connected to a server CL.

In the embodiment, the cooling device control module 416, the light source control module 417, and the sensing module 418 of the projection device 41*a* are coupled to the processor 411, the sensing module 418 is configured to transmit the sensing result to the processor 411, and therefore the processor correspondingly controls the cooling device control module 416 and the light source control module 417 according to the sensing result. The light source control module 417 is configured to receive a control signal from the processor 411 and adjust the brightness of the projection image projected by the projection module 412 according to the control signal, and the cooling device control module 416 is adapted to receive another control signal from the processor 411 and control the cooling device of the projection device 41*a* to dissipate heat according to the other control signal.

Specifically, the sensing module 418 is, for example, at least one of a time of flight (ToF) module, a color sensing module, a temperature sensing module, and an image capture module, etc.

When the sensing module 418 is, for example, a ToF module or an image capture module, after the sensing module 418 provides the sensing information to the processor 411 via a path CP3, the processor 411 then controls the image processing unit 4120 in the projection module 412 via the path CP2, so as to perform an operation such as adjusting the focus to adjust the clarity of the projection image, or performing keystone correction on the projection image.

When the sensing module 418 is, for example, a temperature sensing module, the sensing module 418 may be located adjacent to a specific component (a component such as an optical engine, a light source, a light valve, the processor 411) disposed inside the projection device 41*a* to detect the operating temperature thereof. The sensing module 418 may provide the sensing result to the processor 411 via the path CP3. The processor 411 then controls the cooling device control module 416 via a path CP5 according to the sensing result, so that the cooling device control module 416 controls the cooling device to appropriately perform a corresponding cooling operation on a specific component. In the embodiment, the cooling device is, for example, a fan or a thermoelectric cooler (TEC), but is not limited thereto. Alternatively, after receiving the temperature sensing result, the processor 411 may send a control signal to the light source control module 417 via a path CP6 to adjust the magnitude of the power or the driving current of the light source control module 417 to prevent the light source from overheating.

In addition, the prompt processing module 415 is coupled to the processor 411. When the processor 411 executes at least one control command, the processor 411 also controls the prompt processing module 415 to generate a prompt signal corresponding to the at least one control command. Specifically, the prompt processing module 415 may be configured to provide a prompt signal to assist the user in operating the projection system 4*a* by providing operation feedback when the projection device 41*a* does not have an OSD menu program. According to different usage requirements, the prompt signal may have different forms. For example, the prompt signal may include at least one of a prompt icon, a prompt voice or sound effect, and a prompt flashing light.

In some embodiments, when the prompt processing module 415 generates a prompt voice signal, when the processor 411 performs an operation of switching the input source IN, for example, the processor 411 may control the prompt processing module 415 via the path CP4 to send the corresponding switching prompt voice signal.

In some embodiments, when the prompt processing module 415 is, for example, a liquid-crystal screen and configured to generate a prompt icon signal, for example, when the processor 411 performs an operation of switching the input source IN, the processor 411 may control the prompt processing module 415 via the path CP4 to display a prompt icon of switching the input source.

In some embodiments, the prompt processing module 415 includes, for example, an LED, the LED may be disposed at the surface of the projection device 41*a*, and the processor 411 may control the prompt processing module 415 to emit light via the path CP4, thereby providing the user with operation feedback of different flashing light signals.

In addition, the controller 30 is wirelessly connected to the server CL. Specifically, since the controller 30 may be, for example, a portable electronic device, when the portable electronic device executes an application program, the portable electronic device may be paired with the projection device 41*a*. After the pairing is completed, the portable electronic device may obtain the device information (information such as brand, model, etc.) corresponding to the projection device 41*a*, so as to display a function menu corresponding to the projection device 41*a* on the portable electronic device according to the device information. In the embodiment, the controller 30 may query the server CL according to the device information of the projection device 41*a*, and obtain the function menu configuration file corresponding to the projection device 41*a*. Accordingly, the application program may display the function menu of the projection device 41*a* according to the function menu configuration file, thereby providing the user with a convenient operating environment.

Figure 4B:
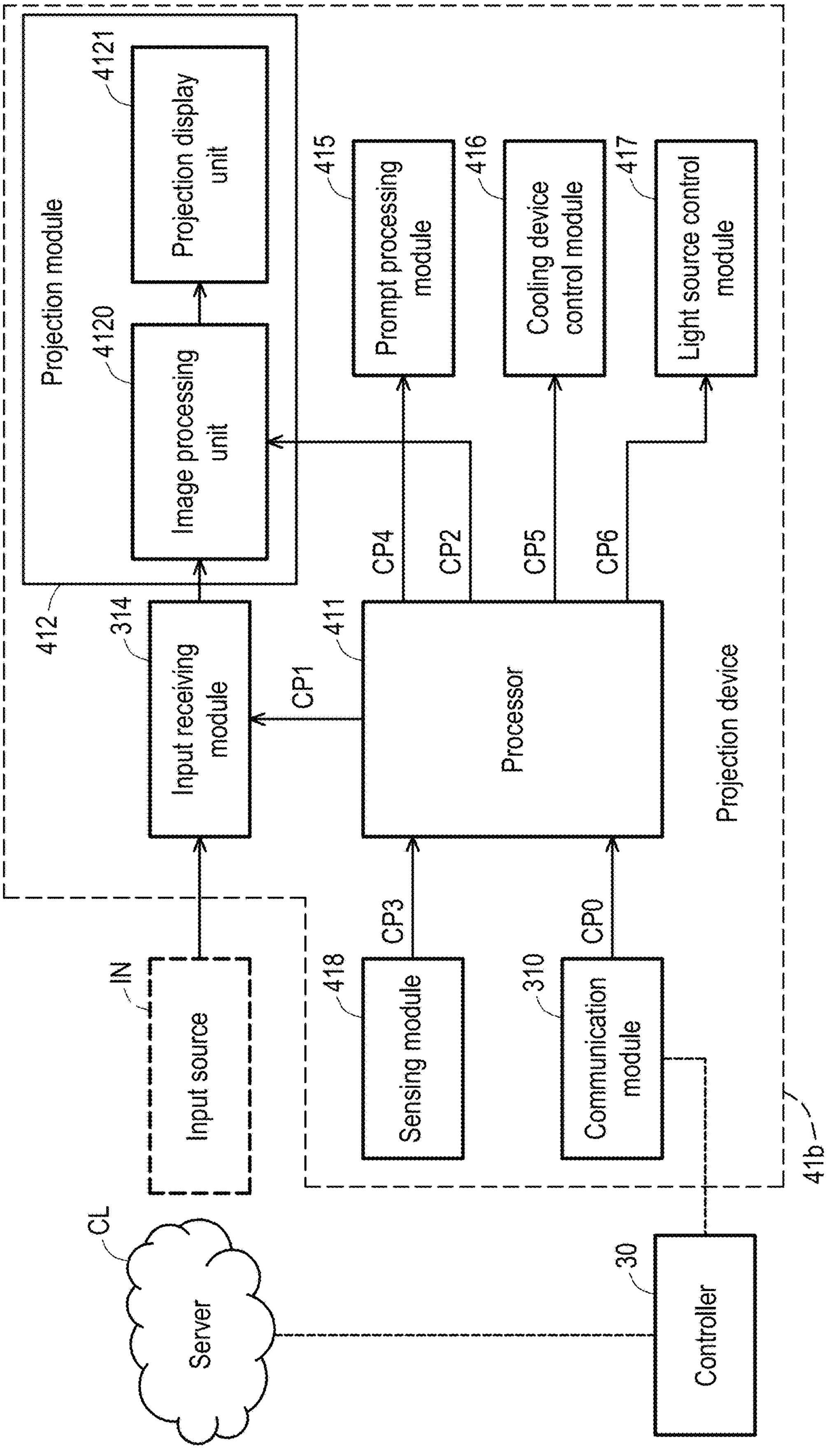
FIG. 4B is a block diagram of a projection system of an embodiment of the invention.

FIG. 4B is a block diagram of a projection system 4*b* of an embodiment of the invention. The projection system 4*b* in FIG. 4B is similar to the projection system 4*a* in FIG. 4A. The difference is that the communication module 310 in the projection system 4*b* is disposed in a projection device 41*b*. The communication module 310 disposed in the projection device 41*b* does not require a communication port and may be directly connected to the processor 411 to transmit a control command. In the embodiment, the communication module 310 may be, for example, a wireless communication integrated circuit or a wireless signal connector built into the projection device 41*b*.

Figure 5A:
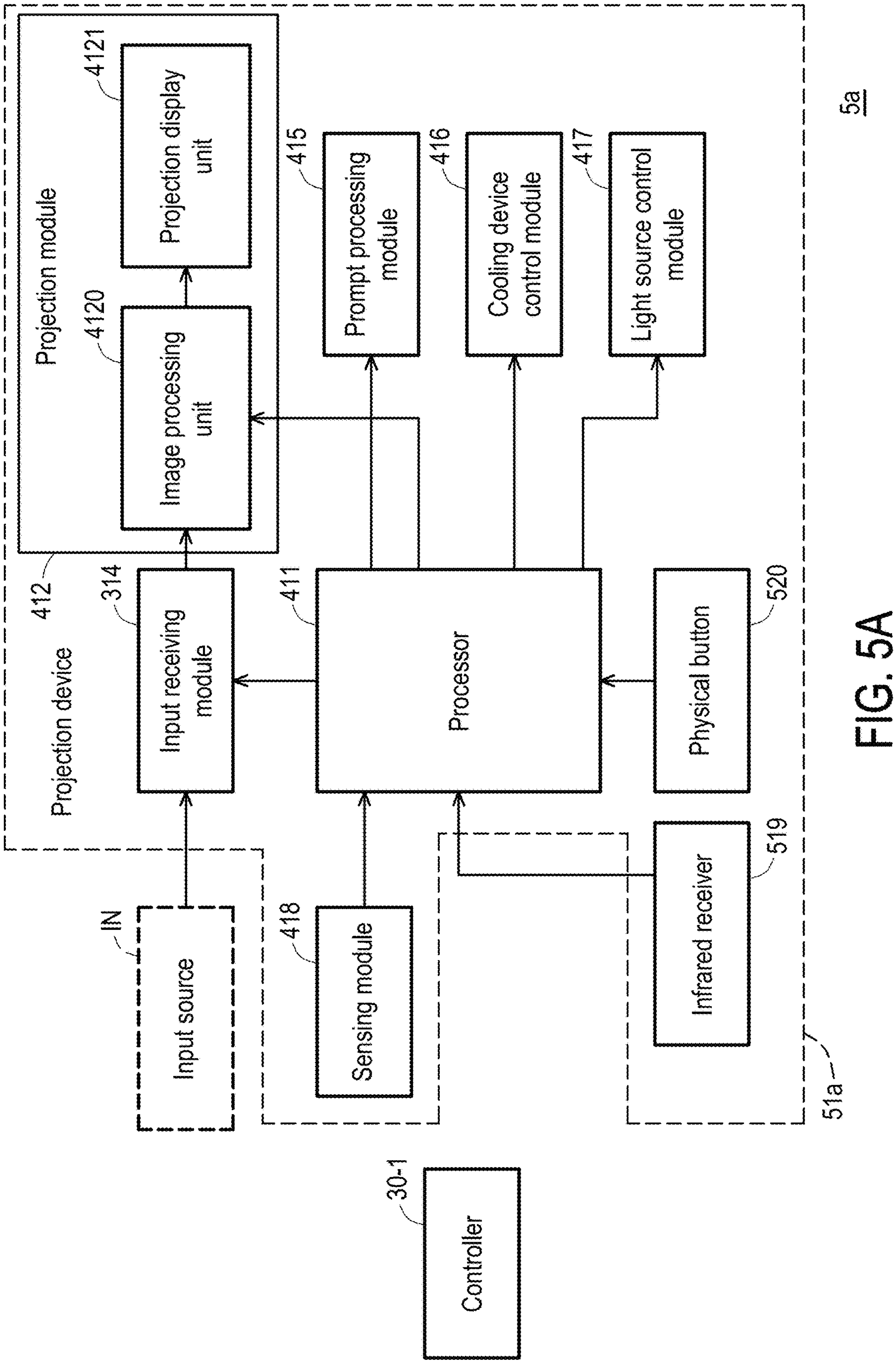
FIG. 5A is a block diagram of a projection system of an embodiment of the invention.

FIG. 5A is a block diagram of a projection system 5*a* of an embodiment of the invention. The projection system 5*a* in FIG. 5A is similar to the projection system 4*a* in FIG. 4A. The difference is that a projection device 51*a* of the projection system 5*a* further includes an infrared receiver (IR) 519 and a physical button 520, the infrared receiver 519 is coupled to the processor 411, and the infrared receiver 519 is configured to receive at least one control command and transmit the at least one control command to the processor 411. In addition, a controller 30-1 of the embodiment may be, for example, a physical remote control, so the communication module 310*a* does not need to be externally connected to the projection device 51*a* of the embodiment.

In the embodiment, since the controller 30-1 is a physical remote control, the physical remote control may be communicatively connected to the projection device 51*a* via the infrared receiver 519. In addition, the physical button 520 disposed on the casing of the projection device 51*a* includes at least one physical button disposed on the casing of the projection device 51*a*. The at least one physical button is adapted to be pressed to correspondingly control at least one function of the projection device 51*a*. Specifically, the physical button 520 may display a simple function, and is, for example, a basic physical button such as a power button or up, down, left, and right buttons. The user presses the physical button 520 to generate a control command. It should be supplemented that the physical button 520 may also be configured in the projection devices of FIG. 3A, FIG. 3B, FIG. 4A, and FIG. 4B, and the function thereof is as described in the embodiment, so the details are not described again.

Figure 5B:
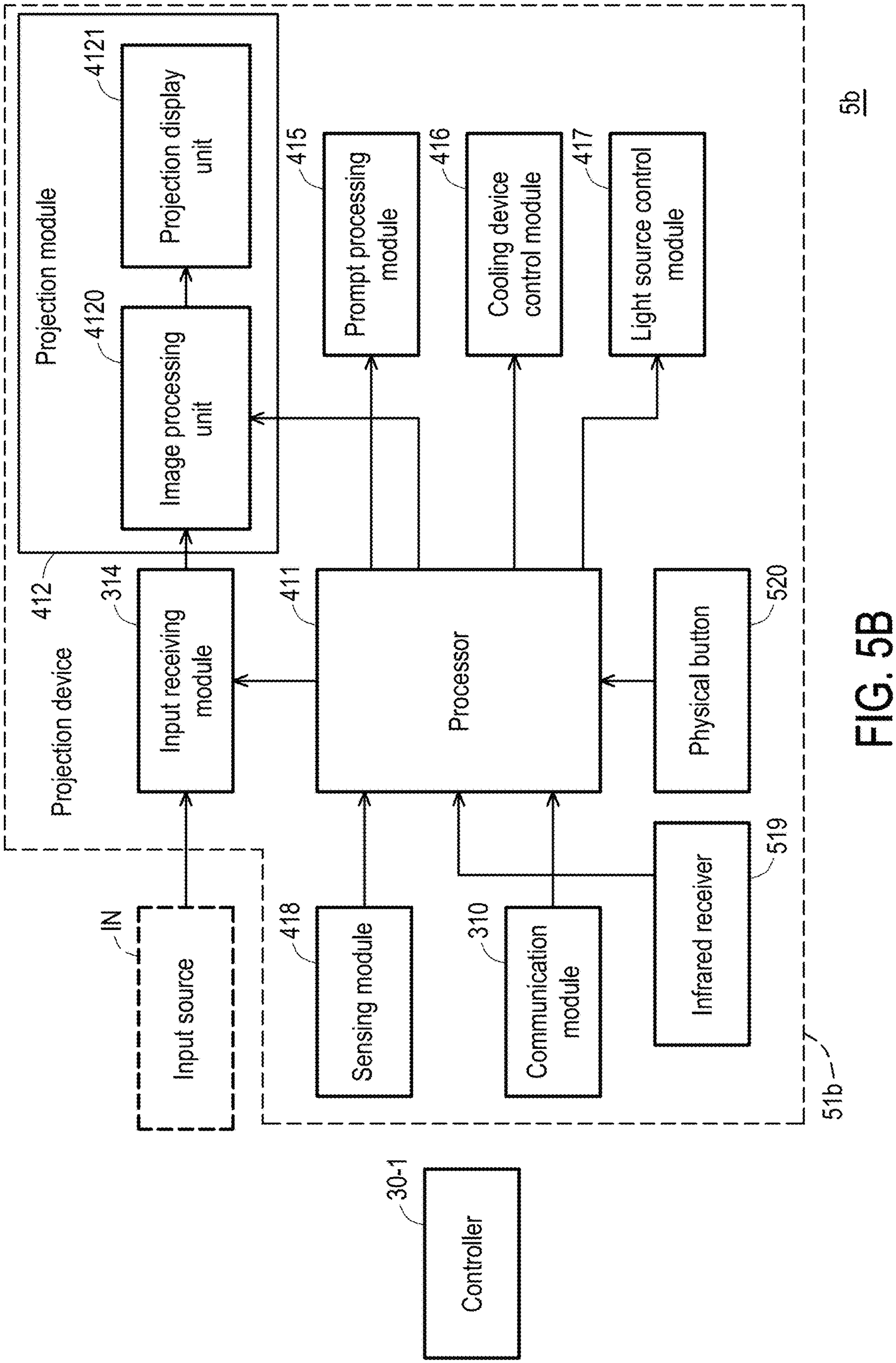
FIG. 5B is a block diagram of a projection system of an embodiment of the invention.

FIG. 5B is a block diagram of a projection system 5*b* of an embodiment of the invention. The projection system 5*b* in FIG. 5B is similar to the projection system 5*a* in FIG. 5A. The difference is that the projection system 5*b* includes the communication module 310 as shown in FIG. 4B. It should be noted that, the object of providing the communication module 310 is, for example, when a portable electronic device is used, the portable electronic device may be coupled to the projection device 51*b* via the communication module 310. This portion may be further described in the following embodiments. The communication module 310 disposed in the projection device 51*b* does not require a communication port and may be directly connected to the processor 411 to transmit a control command. In the embodiment, the communication module 310 may be, for example, a wireless communication integrated circuit or a wireless signal connector built into the projection device 51*b*.

Figure 6A:
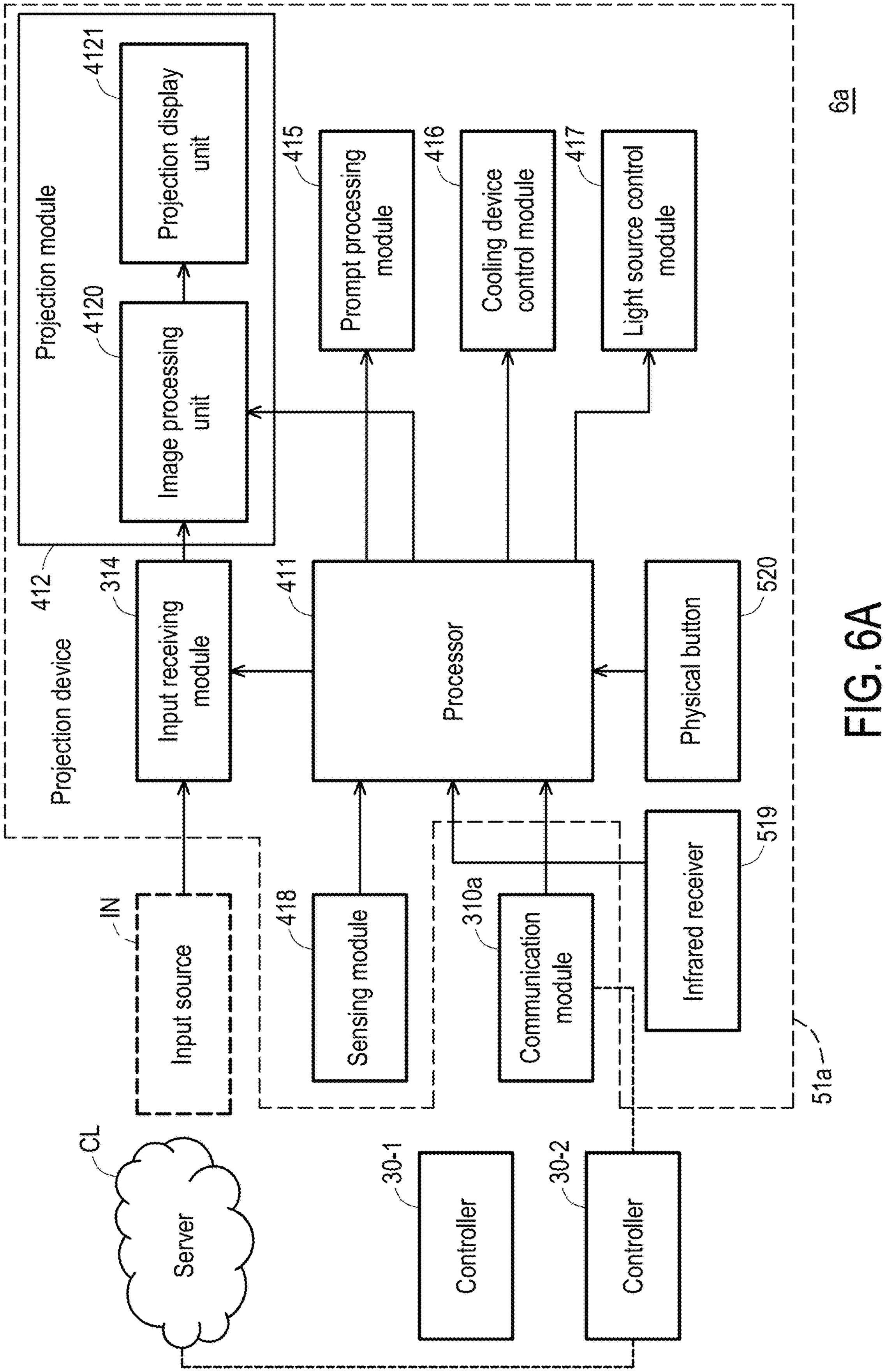
FIG. 6A is a block diagram of a projection system of an embodiment of the invention.

FIG. 6A is a block diagram of a projection system 6*a* of an embodiment of the invention. The projection system 6*a* in FIG. 6A is similar to the projection system 5*a* in FIG. 5A. The difference is that, the projection system 6*a* further shows the server CL, and has both the controller 30-1 and a controller 30-2. The controller 30-1 is, for example, an infrared remote control.

In the embodiment, the infrared receiver 519 of the projection device 51*a* may receive the infrared signal from the controller 30-1, and the controller 30-2 is communicatively connected to the projection device 51*a* via the communication module 310*a*, for example. Either of the controller 30-1 and the controller 30-2 may be configured to provide a control command to the projection device 51*a*, but a function menu may also be displayed on the controller 30-2 to facilitate user operation.

In the embodiment, as mentioned in the explanatory paragraphs of FIG. 4A in the previous paragraphs, the controller 30-2 may also be communicatively connected to the server CL, so that after the pairing of the controller 30-2 and the projection device 51*a* is completed, the corresponding function menu configuration file is obtained from the server CL according to the device information of the projection device 51*a*, and a function menu compatible with the function of the projection device 51*a* is displayed accordingly.

Figure 6B:
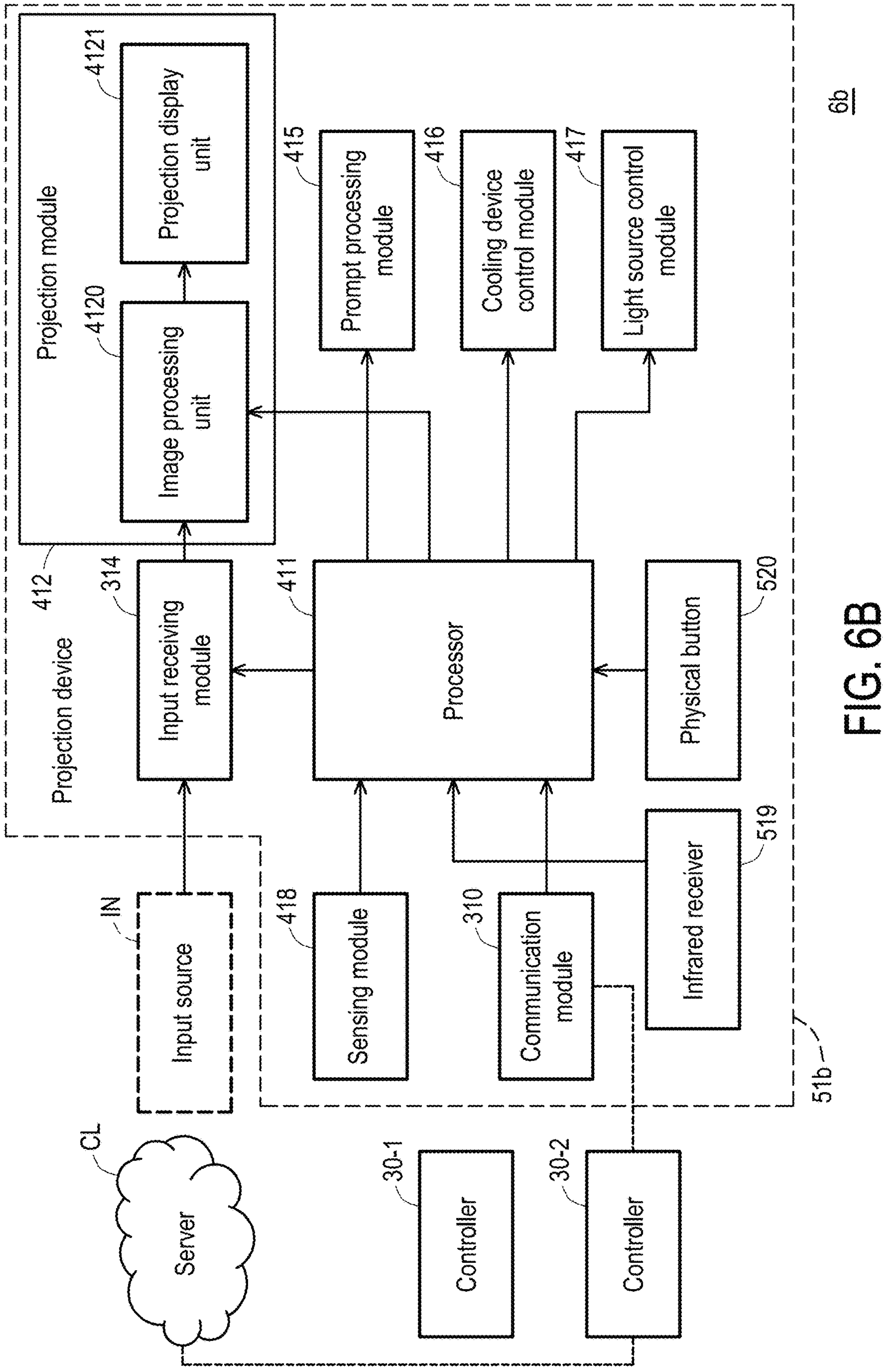
FIG. 6B is a block diagram of a projection system of an embodiment of the invention.

FIG. 6B is a block diagram of a projection system 6*b* of an embodiment of the invention. The projection system 6*b* in FIG. 6B is similar to the projection system 6*a* in FIG. 6A. The difference is that the communication module 310 in the projection system 6*b* is disposed in the projection device 51*b*. The communication module 310 disposed in the projection device 51*b* does not require a communication port and may be directly connected to the processor 411 to transmit a control command. In the embodiment, the communication module 310 may be, for example, a wireless communication integrated circuit or a wireless signal connector built into the projection device 51*b*.

Figure 7:
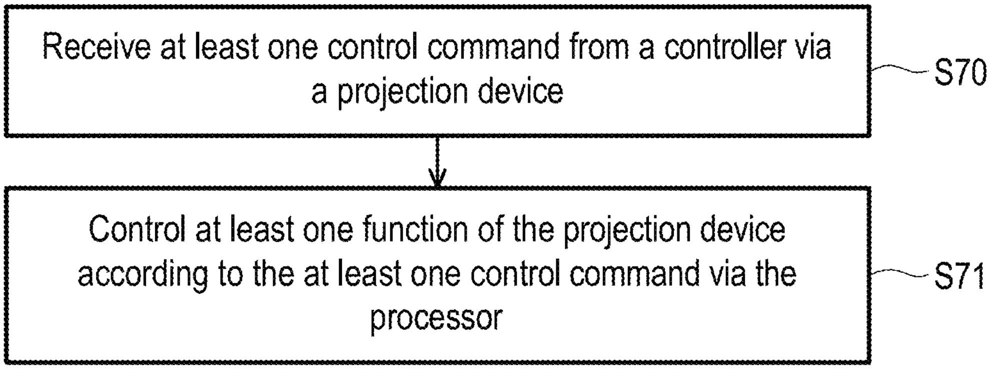
FIG. 7 is a flowchart of a method of controlling a projection device of an embodiment of the invention.

FIG. 7 is a flowchart of a method of controlling a projection device of an embodiment of the invention. The method in FIG. 7 may be used to control, for example, the projection systems 1, 3*a*, 3*b*, 4*a*, 4*b*, 5*a*, 5*b*, 6*a*, and 6*b* in FIG. 1B, FIG. 3A, FIG. 3B, FIG. 4A, FIG. 4B, FIG. 5A, FIG. 5B, FIG. 6A, and FIG. 6B. The projection system includes a controller and a projection device. The projection device is adapted to project a projection image and includes a processor. The projection device is limited to not having an OSD menu program, and therefore the projection image projected by the projection device controlled by the processor does not have an OSD menu. The projection method includes steps S70 to S71.

In step S70, at least one control command from the controller is received via the projection device. In step S71, the processor of the projection device may control at least one function of the projection device according to the at least one control command. For details of steps S70 to S71, please refer to the explanatory paragraphs above regarding FIG. 1A, FIG. 1B, FIG. 3A, FIG. 3B, FIG. 4A, FIG. 4B, FIG. 5A, FIG. 5B, FIG. 6A, and FIG. 6B, which are not described again here.

Overall, via the configuration of the controller and the projection device, the projection system may limit the OSD menu from being displayed in the image projected by the projection device. Via control transmission between the controller and the projection device, the design method of the projection system is simplified and the cost of the projection system is reduced.

Figure 8A:
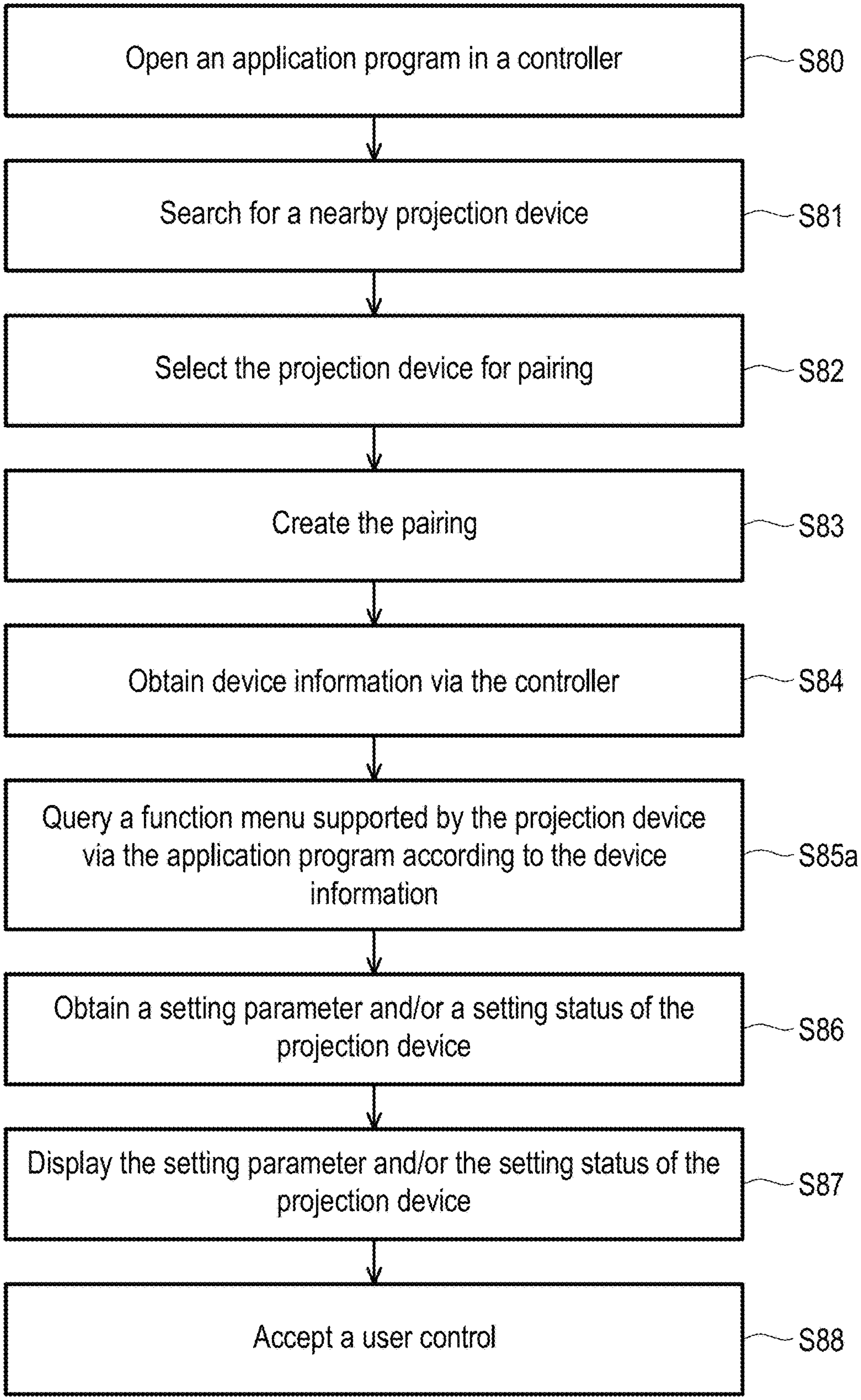
FIG. 8A is a flowchart of a method of enabling an application program in a controller of an embodiment of the invention.

FIG. 8A is a flowchart of a method of enabling an application program in a controller of an embodiment of the invention. The enabling method in FIG. 8A may be applied to any of the controllers 10, 30, 30-1, and 30-2 in FIG. 1B, FIG. 3A, FIG. 3B, FIG. 4A, FIG. 4B, FIG. 5A, FIG. 5B, FIG. 6A, and FIG. 6B. In the embodiment, the controller is, for example, a portable electronic device.

In step S80, an application program in the controller may be opened and executed. In step S81, the controller may execute the application program and search for a nearby pairable projection device via a wireless communication method such as Near Field Communication (NFC). Of course, other connection methods also fall within the scope of variant embodiments. In step S82, the controller may perform pairing according to the projection device selected by the user. In step S83, the projection device and the controller may undergo a pairing process. In step S84, after the pairing relationship is created, the controller may obtain device information of the projection device. For example, the device information may carry information such as the brand and the model of the projection device.

Next, in step S85*a*, the controller may query the function menu supported by the projection device via the application program according to the device information. Specifically, the application program may, for example, store pre-written device information and a lookup table of supported function menu. Therefore, the controller may adjust the function menu displayed in the application program according to the device information to provide function options that are consistent with the functions of the projection device on the function menu.

In step S86, the controller may also obtain a setting parameter and/or a setting status in the projection device. In step S87, the controller may display the setting parameter and/or the setting status of the projection device via the user interface of the application program. In this way, the controller may execute the application program and accept user control in step S88.

Figure 8B:
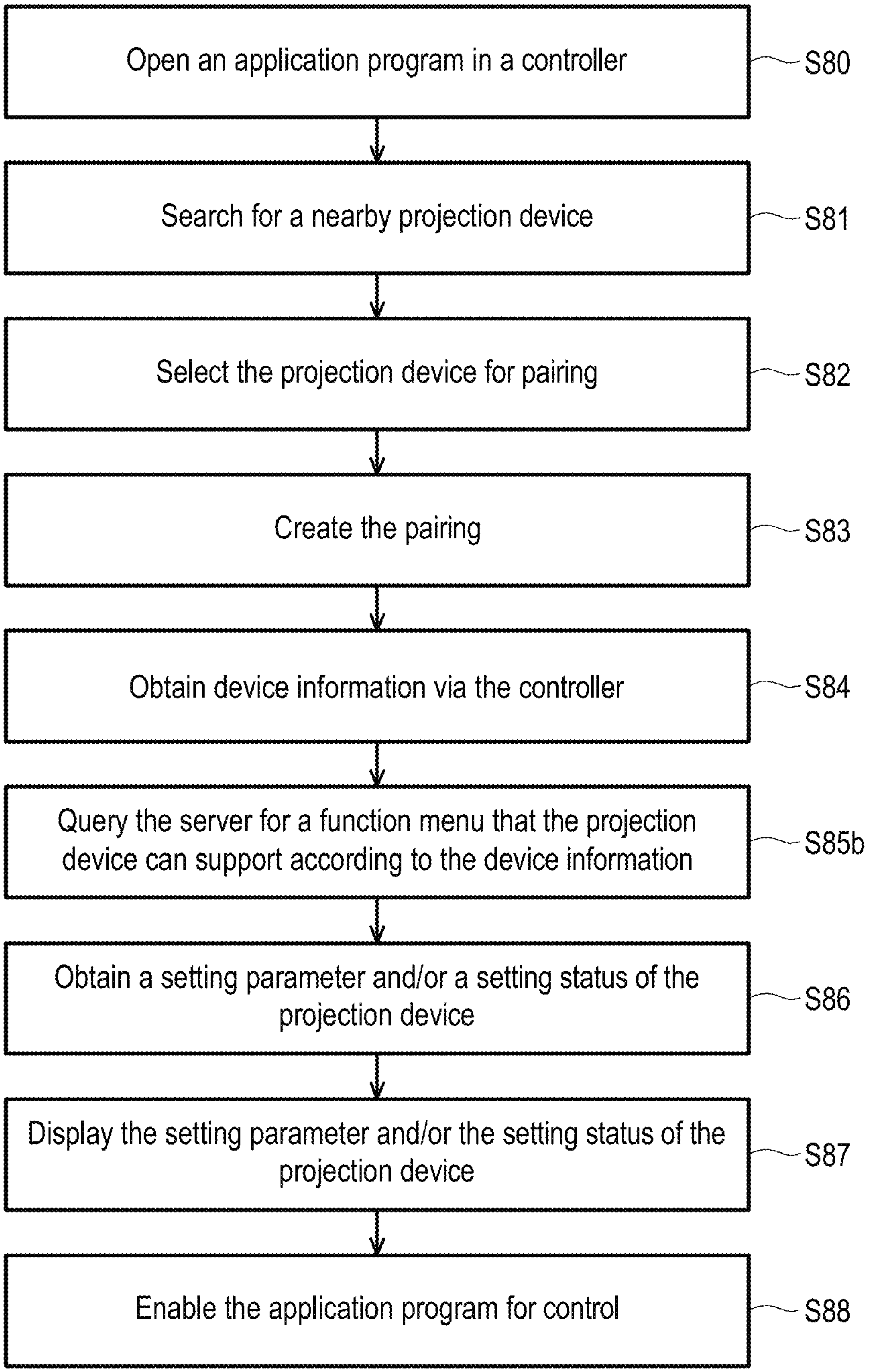
FIG. 8B is a flowchart of a method of enabling an application program in a controller of an embodiment of the invention.

FIG. 8B is a flowchart of a method of enabling an application program in a controller of an embodiment of the invention. The enabling method in FIG. 8B is similar to the enabling method in FIG. 8A, except that step S85*a* in FIG. 8A is replaced by step S85*b*. Specifically, in the enabling method of FIG. 8B, in step S84, after the controller obtains the device information of the projection device, in step S85*b*, the controller may query the server for a function menu that the projection device may support according to the device information, and thereby provide function options that are consistent with the functions of the projection device on the function menu. It should be noted that the flowchart of FIG. 8B may correspond to FIG. 4A, FIG. 4B, FIG. 6A, and FIG. 6B, wherein a projection system includes the server CL. Other steps are the same as in FIG. 8A, so they are not described again.

Figure 9:
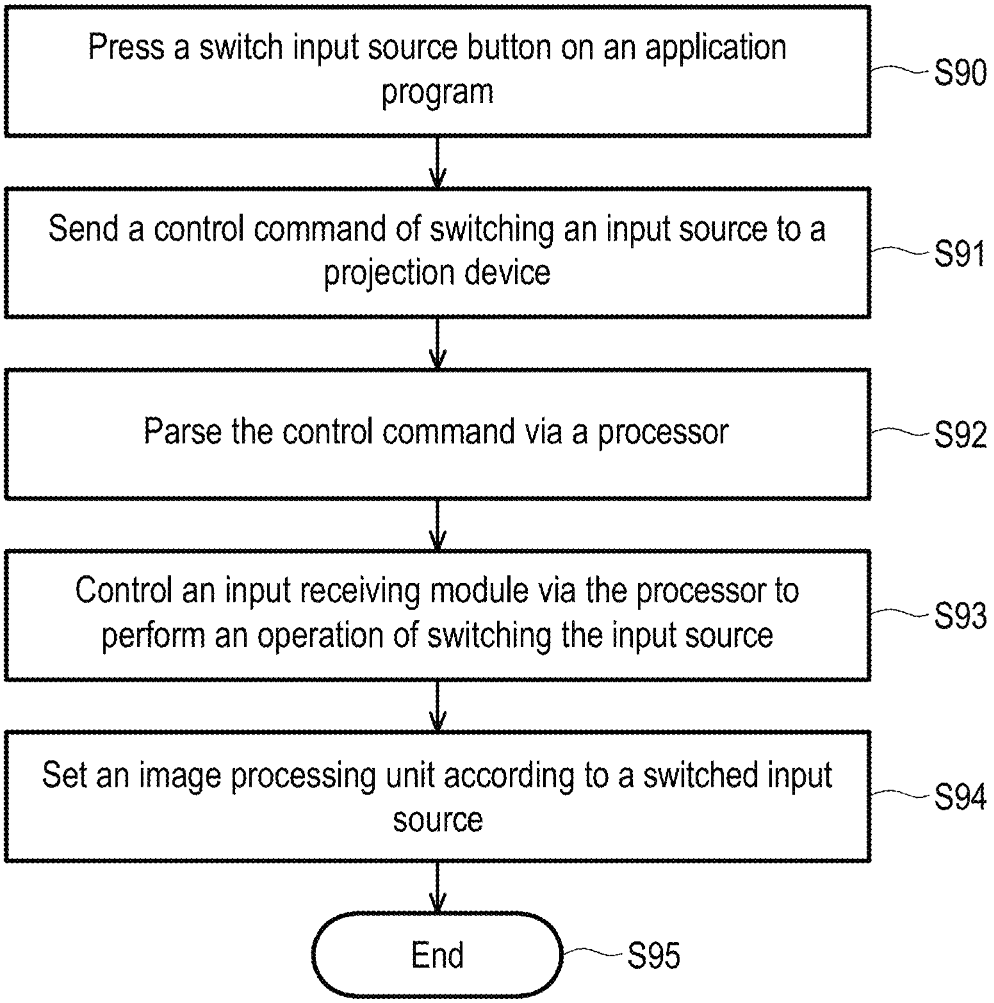
FIG. 9 is a flowchart of a method of controlling a projection device of an embodiment of the invention.

FIG. 9 is a flowchart of a method of controlling a projection device of an embodiment of the invention. The projection method in FIG. 9 may be applied to any of the projection systems 1, 3*a*, 3*b*, 4*a*, 4*b*, 5*a*, 5*b*, 6*a*, and 6*b* in FIG. 1B, FIG. 3A, FIG. 3B, FIG. 4A, FIG. 4B, FIG. 5A, FIG. 5B, FIG. 6A, and FIG. 6B.

In step S90, the controller may execute the application program and receive the control of the user to generate a corresponding control command. In the embodiment, the controller receives the operation of the user of pressing the switch input source button. In step S91, the controller sends a control command of switching the input source to the projection device accordingly. In step S92, the processor in the projection device may parse the control command and confirm the content. In step S93, after the processor confirms that the content of the control command is to switch the input source, the processor may control the input receiving module to switch the input source accordingly. In step S94, the processor may also control the image processing unit at the same time to make the setting (such as color setting, resolution setting, contrast setting, gamma setting, etc.) of the image processing unit consistent with the selected input source. Lastly, in step S95, the projection device may project accordingly.

Figure 10:
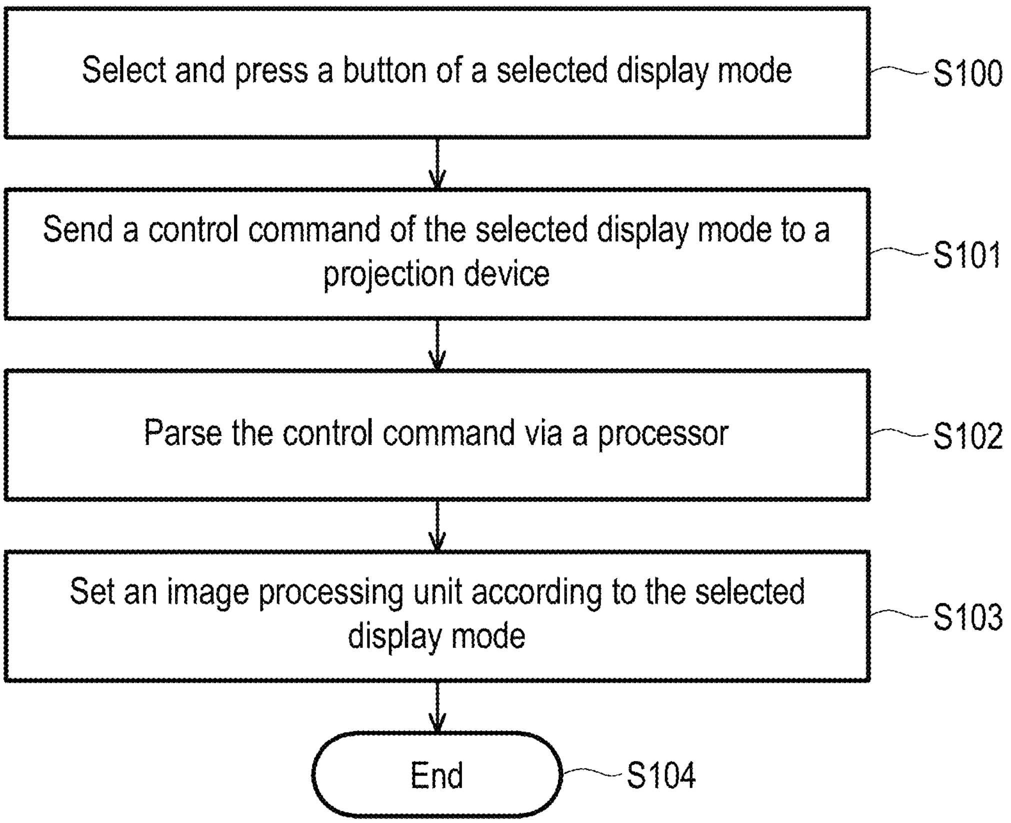
FIG. 10 is a flowchart of a method of controlling a projection device of an embodiment of the invention.

FIG. 10 is a flowchart of a method of controlling a projection device of an embodiment of the invention. The projection method in FIG. 10 may be applied to any of the projection systems 1, 3*a*, 3*b*, 4*a*, 4*b*, 5*a*, 5*b*, 6*a*, and 6*b* in FIG. 1B, FIG. 3A, FIG. 3B, FIG. 4A, FIG. 4B, FIG. 5A, FIG. 5B, FIG. 6A, and FIG. 6B.

In step S100, the controller may accept user control and issue a corresponding control command. In the embodiment, the user may select a selected display mode and press the corresponding button displayed on the screen. In step S101, the controller may send a control command of switching to the selected display mode to the projection device. In step S102, the processor in the projection device may parse the control command and confirm the content. In step S103, after the processor confirms that the content of the control command is to switch to the selected display mode, the processor may control the image processing unit to perform settings accordingly, so as to adjust the setting parameter corresponding to the selected display mode. Lastly, in step S104, the projection device may project according to the selected display mode.

Figure 11:
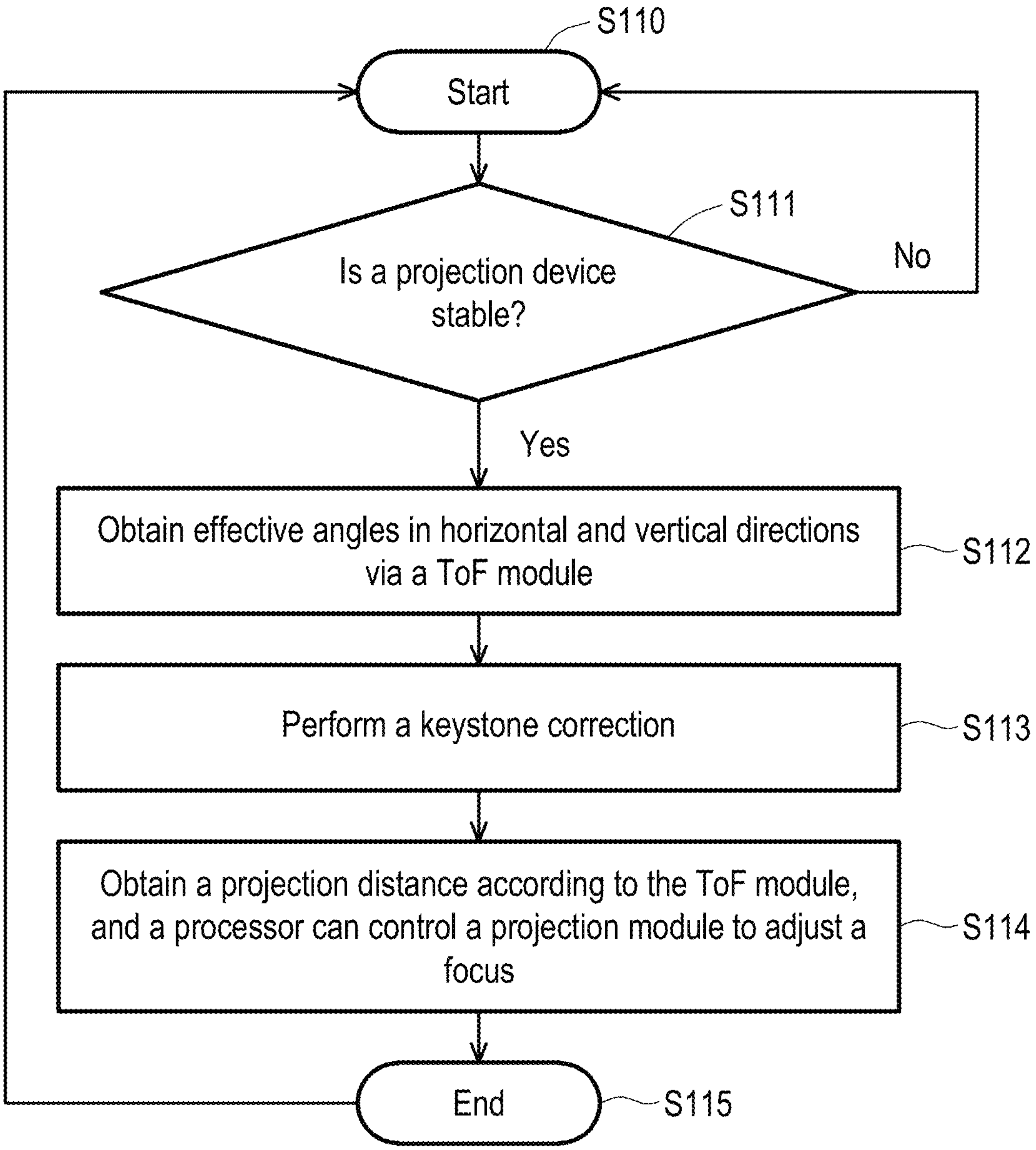
FIG. 11 is a flowchart of a method of controlling a projection device of an embodiment of the invention.

FIG. 11 is a flowchart of a method of controlling a projection device of an embodiment of the invention. The projection method in FIG. 11 may be applied to any of the projection systems 1, 3*a*, 3*b*, 4*a*, 4*b*, 5*a*, 5*b*, 6*a*, and 6*b* in FIG. 1B, FIG. 3A, FIG. 3B, FIG. 4A, FIG. 4B, FIG. 5A, FIG. 5B, FIG. 6A, and FIG. 6B. In the embodiment, it should be noted that the sensing module in the projection device, such as a ToF module, may perform sensing periodically. The ToF module may include a g-sensor. The g-sensor may be configured to sense the acceleration change amount of the projection device, and the ToF module itself may be configured to sense the distance between the projection device and the projection plane, for example. When the projection device is moved, the processor may receive information of the acceleration change amount from the g-sensor in real time. The processor may continuously receive the information of acceleration change amount and determine whether the information of acceleration change amount is less than a preset threshold. If the information of acceleration change amount is less than the preset threshold, the projection device is not moved anymore, and therefore it is determined that the projection device enters a stable state. If the information of acceleration change amount is greater than the preset threshold, the projection device may still be moving, and therefore it is determined that the projection device has not yet entered the stable state.

The projection method of the embodiment includes the following steps. First, in step S110, the projection device is enabled. After the projection device is enabled, in step S111, when the processor determines that the projection device is in a stable state, step S112 is entered, and the ToF module provides the sensing result to the processor, that is, the effective angles in the horizontal and/or vertical directions of the projection plane relative to the projection direction of the projection device are provided to the processor. In contrast, when the processor determines that the projection device has not entered the stable state, step S110 is repeated, and the g-sensor in the ToF module continues to sense whether the projection device is stabilized. Next, in step S113, the processor may control the projection module to perform keystone correction according to the sensing result. Next, in step S114, since the ToF module may sense and obtain the projection distance between the projection device and the projection plane, the processor may control the projection module accordingly to adjust the focus appropriately. Lastly, in step S115, the projection device may update the projection image after the keystone correction and the focus adjustment are completed.

Based on the above, via the configuration of the controller and the projection device, the projection system may limit the OSD menu from being displayed in the image projected by the projection device. Via control transmission between the controller and the projection device, the design method of the projection system is simplified and the cost of the projection system is reduced.

However, the above are only preferred embodiments of the invention, and should not be used to limit the scope of the invention. That is, all simple equivalent changes and modifications made based on the claims of the invention and the specification content of the invention are still within the scope of the patent of the invention. In addition, any embodiment or patentable scope of the invention does not need to achieve all the objects, advantages, or features disclosed in the invention. In addition, the abstract section and the title are only used to assist in searching patent documents and are not intended to limit the scope of the invention. In addition, terms such as "first" and "second" mentioned in the present specification or claims are only used to name elements or to distinguish different embodiments or scopes and are not used to limit the upper limit or the lower limit of the quantity of elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, configured to receive at least one control command, wherein the projection device comprises a projection module and a processor, wherein:

the projection module is configured to project and display a projection image; and the processor is coupled to the projection module and controls the projection device according to the at least one control command, wherein the projection device is limited to not having an on-screen display (OSD) menu program, and the projection image provided by the projection module controlled by the processor does not have an OSD menu, wherein the projection device further comprises a prompt processing module coupled to the processor, wherein when the processor executes the at least one control command, the processor controls the prompt processing module to generate a prompt signal corresponding to the at least one control command, and wherein the prompt signal provides operation feedback when the projection device is limited to not having the OSD menu program.

2. The projection device of claim 1, further comprising:

an input receiving module coupled to the processor and the projection module and configured to receive image data, wherein the input receiving module decodes the image data into display data having a preset specification and provides the display data to the projection module.

3. The projection device of claim 1, further comprising a communication module, wherein the communication module is externally connected or built-in to the projection device, and the communication module is coupled to the processor of the projection device and configured to receive the at least one control command and transmit the at least one control command to the processor.

4. The projection device of claim 1, further comprising an infrared receiver coupled to the processor, wherein the infrared receiver is configured to receive the at least one control command and transmit the at least one control command to the processor.

5. The projection device of claim 1, further comprising:

a cooling device;

a light source; and a sensing module coupled to the processor and configured to transmit a sensing result to the processor, wherein the processor is configured to correspondingly control the cooling device and the light source according to the sensing result.

6. The projection device of claim 5, wherein the processor is configured to adjust a brightness of the light source for the projection image projected by the projection module according to a control signal, and the processor is configured to control the cooling device of the projection device to dissipate a heat according to another control signal.

7. The projection device of claim 1, further comprising: at least one physical button disposed on a casing of the projection device, wherein the at least one physical button is adapted to be pressed to correspondingly control at least one function of the projection device.

8. The projection device of claim 1, wherein the prompt signal comprises at least one of a prompt icon, a prompt voice or sound effect, and a prompt flashing light.

9. A projection system, comprising a controller and the projection device of claim 1, wherein the controller is adapted to be communicatively connected to the projection device, and the controller provides the at least one control command to the projection device, so that the processor controls at least one function of the projection device according to the at least one control command.

10. The projection system of claim 9, wherein the projection device also comprises an infrared receiver coupled to the processor, and the infrared receiver is configured to receive the at least one control command from the controller and transmit the at least one control command to the processor.

11. The projection system of claim 10, wherein the controller has at least one button, and the at least one button is adapted to be pressed to correspondingly provide the at least one control command for controlling the at least one function of the projection device.

12. The projection system of claim 9, wherein the projection system comprises a communication module adapted to be externally connected to the projection device and configured to receive the at least one control command from the controller and transmit the at least one control command to the processor; or the projection device further comprises the communication module built into the projection device, and the communication module is coupled to the processor of the projection device and configured to receive the at least one control command from the controller and transmit the at least one control command to the processor.

13. The projection system of claim 12, wherein the controller is a portable electronic device, the portable electronic device has an application program, when the application program is started, a screen of the portable electronic device displays a function menu, the function menu has at least one function option, and the at least one function option is adapted to provide the at least one control command for controlling the at least one function of the projection device.

14. The projection system of claim 13, wherein when the application program is executed, the portable electronic device is paired with the projection device, and after the pairing is completed, the portable electronic device obtains device information corresponding to the projection device, and therefore the function menu corresponding to the projection device is displayed on the portable electronic device according to the device information.

15. A method of controlling a projection device, adapted for a projection system, wherein the projection system comprises a controller and the projection device, the projection device is adapted to project a projection image and comprises a processor, the projection device is limited to not having an OSD menu program, and therefore the projection image projected by the projection device controlled by the processor does not have an OSD menu, and the method comprises the following steps:

receiving at least one control command from the controller via the projection device; and controlling at least one function of the projection device according to the at least one control command via the processor, wherein the projection device comprises a prompt processing module, and the step of controlling the at least one function of the projection device according to the at least one control command via the processor further comprises: when the processor executes the at least one control command, controlling the prompt processing module to generate a prompt signal corresponding to the at least one control command, and wherein the prompt signal provides operation feedback when the projection device is limited to not having the OSD menu program.

16. The method of claim 15, wherein the projection device further comprises an infrared receiver coupled to the processor; and the step of receiving the at least one control command from the controller via the projection device further comprises:

receiving the at least one control command via the infrared receiver and transmitting the at least one control command to the processor.

17. The method of claim 15, wherein the projection system comprises a communication module adapted to be externally connected to the projection device, or the projection device comprises the communication module built into the projection device, and the communication module is coupled to the processor of the projection device; and the step of receiving the at least one control command from the controller via the projection device further comprises:

receiving the at least one control command via the communication module and transmitting the at least one control command to the processor.

18. The method of claim 17, wherein the controller is a portable electronic device, the portable electronic device has an application program, and the method further comprises the following steps:

launching and executing the application program via the portable electronic device;

displaying a function menu via the portable electronic device, wherein the function menu has at least one function option; and providing the at least one control command by operating the at least one function option to control the at least one function of the projection device.

19. The method of claim 18, wherein the steps further comprise:

pairing the portable electronic device with the projection device;

obtaining device information corresponding to the projection device via the portable electronic device after the pairing is completed; and displaying the function menu corresponding to the projection device via the portable electronic device according to the device information.

20. The method of claim 15, wherein the prompt signal comprises at least one of a prompt icon, a prompt voice or sound effect, and a prompt flashing light.

* * * * *